United States Patent
Bressanelli et al.

(10) Patent No.: US 12,549,282 B2
(45) Date of Patent: Feb. 10, 2026

(54) PRUNING DCI FOR NR BWP SWITCHING

(71) Applicant: QUALCOMM Incorporated, San Diego, CA (US)

(72) Inventors: Dominique Francois Bressanelli, Eschborn (DE); Pankaj Bansal, Hyderabad (IN); Ravi Kanth Kotreka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/664,383

(22) Filed: May 20, 2022

(65) Prior Publication Data

US 2023/0379079 A1    Nov. 23, 2023

(51) Int. Cl.
| | |
|---|---|
| *H04L 1/00* | (2006.01) |
| *H04L 5/14* | (2006.01) |
| *H04W 72/044* | (2023.01) |
| *H04W 72/23* | (2023.01) |

(52) U.S. Cl.
CPC .......... *H04L 1/0061* (2013.01); *H04L 1/0038* (2013.01); *H04L 1/0045* (2013.01); *H04L 5/1469* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2015/0098341 A1 | 4/2015 | Ramkumar et al. | |
| 2017/0164345 A1* | 6/2017 | Goto | H04W 16/14 |
| 2018/0006662 A1 | 1/2018 | Gho et al. | |
| 2020/0252165 A1* | 8/2020 | Nunome | H04L 5/14 |
| 2021/0266880 A1* | 8/2021 | Horiuchi | H04L 1/203 |
| 2021/0298052 A1* | 9/2021 | Namba | H04L 1/1851 |
| 2022/0303050 A1* | 9/2022 | Tiri | H04L 1/0047 |
| 2023/0038330 A1* | 2/2023 | Yang | H04L 1/0003 |

FOREIGN PATENT DOCUMENTS

| | | |
|---|---|---|
| WO | 2021026926 A1 | 2/2021 |
| WO | 2021035448 A1 | 3/2021 |

OTHER PUBLICATIONS

English Translation of IDS Reference Zhang et al., WO 2021035448 A1, Published Mar. 4, 2021 (Year: 2021).*

(Continued)

*Primary Examiner* — Saumit Shah
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for false positive detections of DCI requests to switch BWPs. A UE may receive a DCI request to switch from a first BWP to a second BWP and may reject the DCI request for a switch from the first BWP to the second BWP based on at least one of a conflict with a TDD pattern associated with the DCI request, a DCI decoder metric, or a number of error-corrected modulation symbols that indicates a false positive detection of the DCI request.

30 Claims, 7 Drawing Sheets

(56) References Cited

OTHER PUBLICATIONS

Huawei, et al., "Clarification on the Initial BWP Switching", 3GPP TSG-RAN WG1 Meeting #108-e, R1-2202451, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, Feb. 14, 2022, XP052114862, 3 pages.
International Search Report and Written Opinion—PCT/US2023/021582—ISA/EPO—Aug. 30, 2023.
3GPP: "3rd Generation Partnership Project, Technical Specification Group Radio Access Network, NR, Physical Layer Procedures for Control (Release 15)", 3GPP TS 38.213 V15.14.0 including section 10.1, Jun. 2021, 110 Pages.

\* cited by examiner

PRUNING DCI FOR NR BWP SWITCHING

TECHNICAL FIELD

The present disclosure relates generally to communication systems, and more particularly, to false positive detections of downlink control information (DCI) requests to switch bandwidth parts (BWPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a downlink control information (DCI) request to switch from a first bandwidth part (BWP) to a second BWP; and reject the DCI request for a switch from the first BWP to the second BWP based on at least one of a conflict with a time division duplex (TDD) pattern associated with the DCI request, a DCI decoder metric, or a number of error-corrected modulation symbols that indicates a false positive detection of the DCI request.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
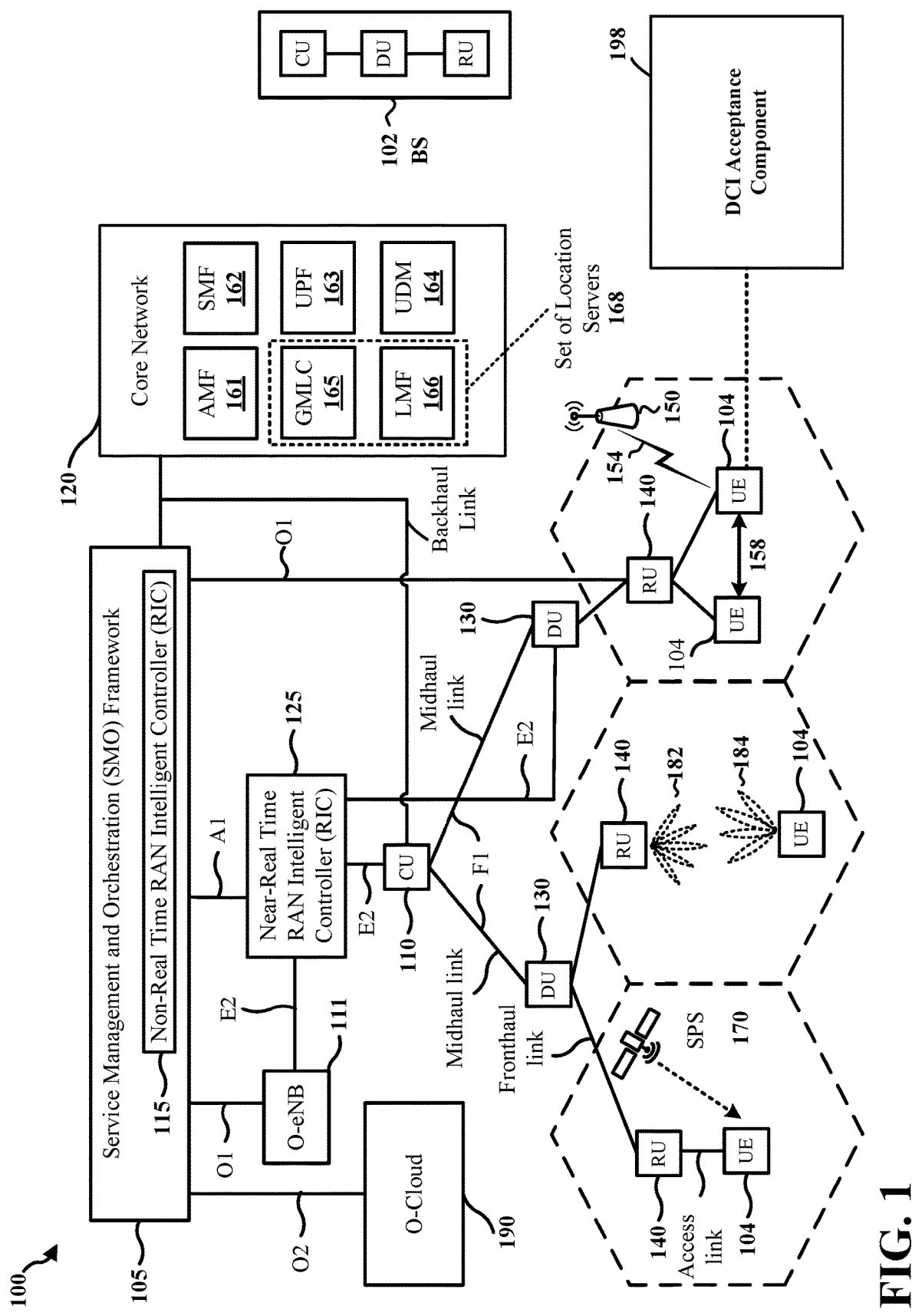
FIG. 1 is a diagram illustrating an example of a wireless communications system and an access network.

Noise received by a user equipment (UE) may cause the UE to falsely detect downlink control information (DCI). In some examples, a false positive DCI detection may correspond to a DCI request for switching from a first bandwidth part (BWP) to a second BWP. That is, the UE may falsely detect a BWP switching request that was not actually transmitted by a base station. While the impact of a false positive DCI detection associated with procedures other than BWP switching may be limited to 1 slot, such as a falsely triggered physical uplink shared channel (PUSCH) transmission on uplink or an attempt to receive a physical downlink shared channel (PDSCH) that is not transmitted by the base station, a false positive DCI detection of a BWP switching request may have a longer lasting impact on the UE. For example, the UE and the base station may become out of sync based on such DCI requests, such that the UE and the base station may have to perform a random access channel (RACH) procedure to resynchronize (e.g., after the UE declares a radio link failure (RLF) and possibly radio resource control (RRC) reestablishment). Accordingly, aspects presented herein enable the UE to verify/confirm whether a detected DCI request to switch BWPs is a false positive detection (e.g., received in noise) or an actual DCI request transmitted by the base station. The verification/confirmation of the DCI request to switch BWPs may be based on information consistency within a time division duplex (TDD) pattern for a PDSCH reception or a physical uplink shared channel (PUSCH) transmission, a DCI decoder/energy metric associated with the detected DCI request, and/or a number of error-corrected symbols associated with DCI decoding.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The dis aggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DCI acceptance component 198 configured to receive a DCI request to switch from a first BWP to a second BWP; and reject the DCI request for a switch from the first BWP to the second BWP based on at least one of a conflict with a TDD pattern associated with the DCI request, a DCI decoder metric, or a number of error-corrected modulation symbols that indicates a false positive detection of the DCI request. Although the following description may be focused on 5G NR, the concepts described herein may be applicable to other similar areas, such as LTE, LTE-A, CDMA, GSM, and other wireless technologies.

Figure 2:
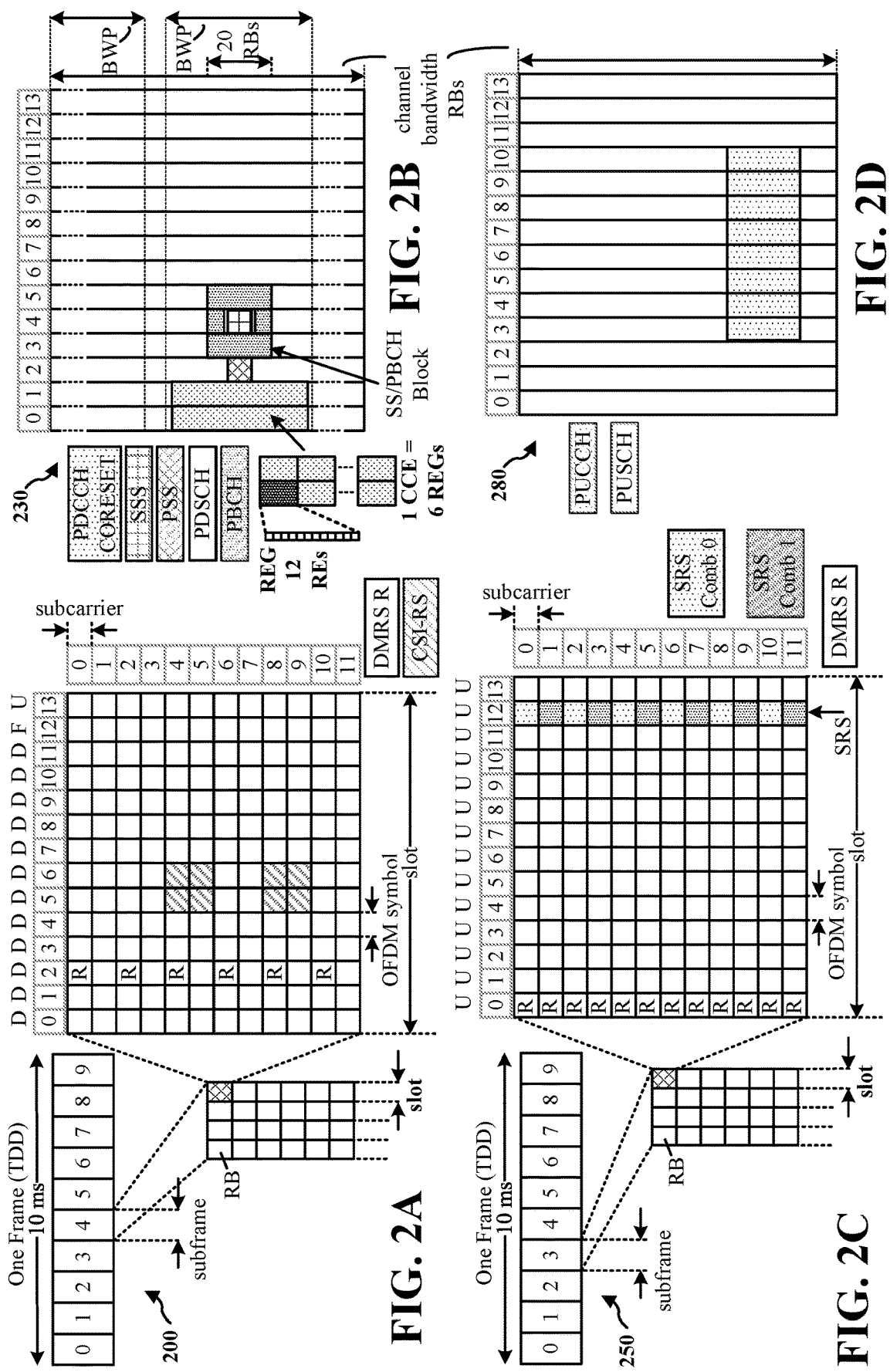
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through RRC signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15 [kHz]$ | Cyclic<br>prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different BWPs (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
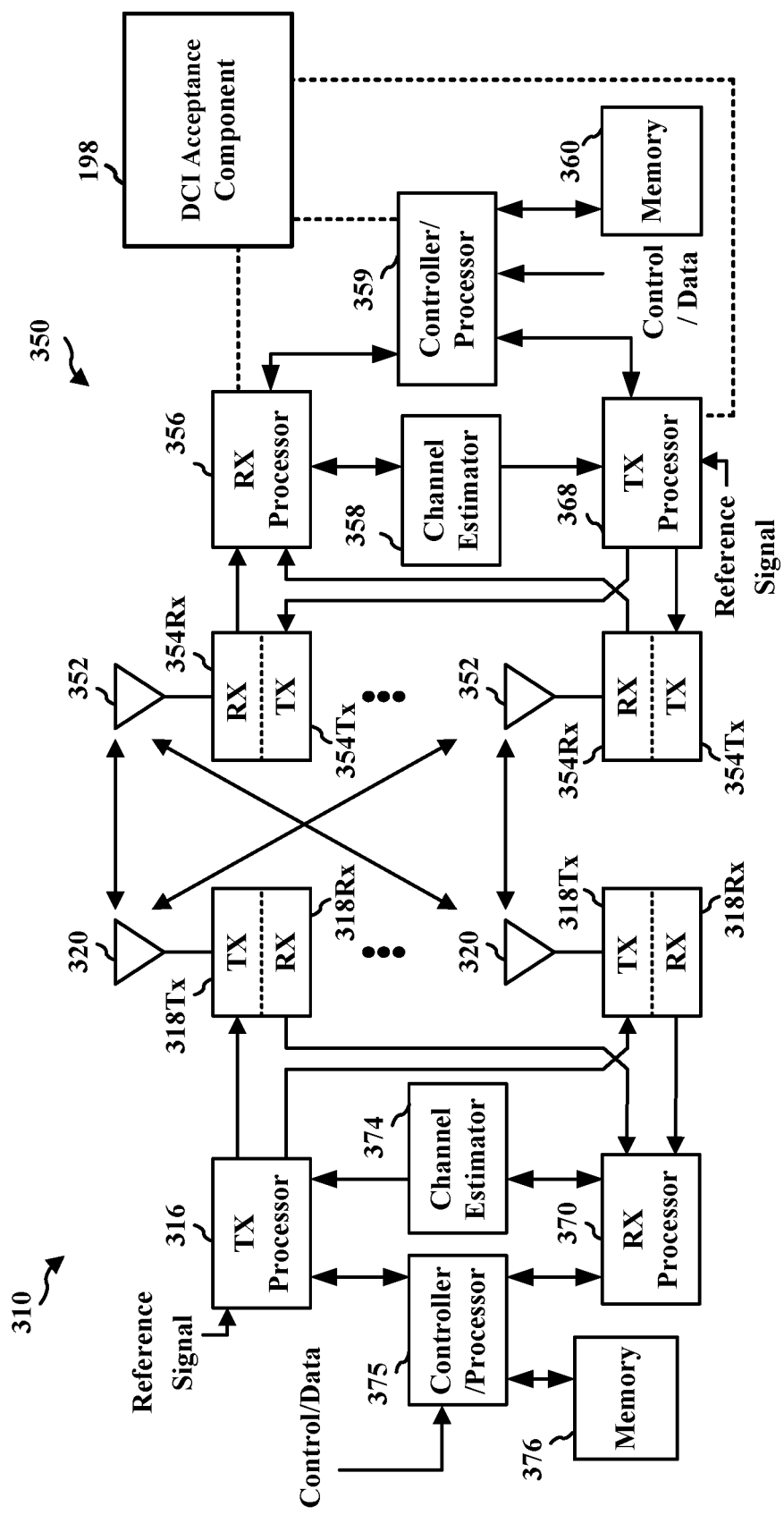
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DCI acceptance component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
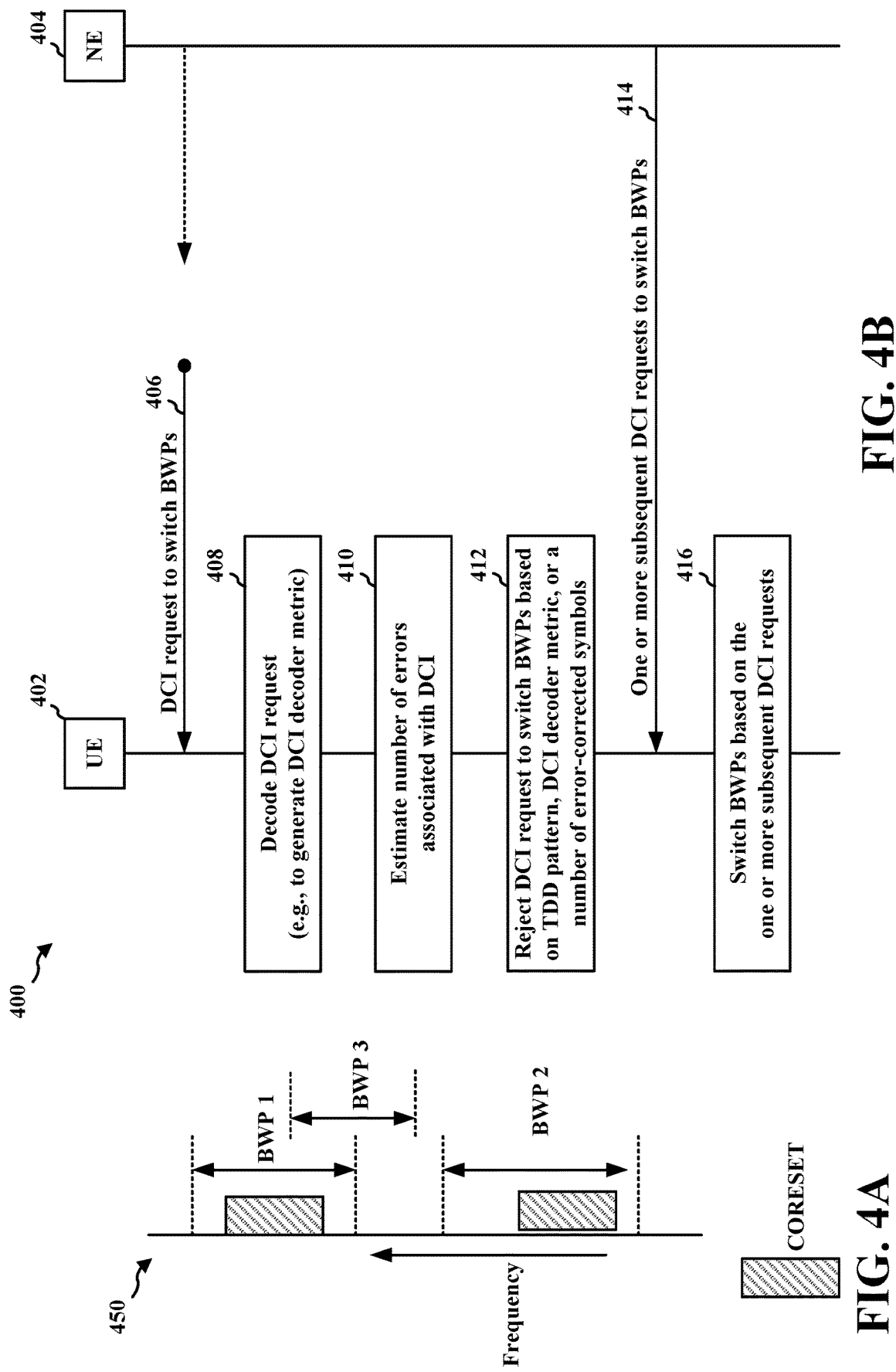
FIG. 4A illustrates a resource diagram with an example of multiple BWPs.
FIG. 4B is a call flow diagram illustrating communications between a UE and a network entity.

Noise received by a user equipment (UE) may cause the UE to falsely detect downlink control information (DCI). In some examples, a false positive DCI detection may correspond to a DCI request for switching from a first bandwidth part (BWP) to a second BWP. That is, the UE may falsely detect a BWP switching request that was not actually transmitted by a base station. A UE may be configured with multiple BWPs. FIG. 4A illustrates a resource diagram 450 with an example of three BWPs, e.g., BWP 1, BWP2, and BWP3, each spanning a set of frequency resources, e.g., a set of PRBs. A BWP may be activated for the UE from the set of configured BWPs. The UE may not be expected to receive PDSCH, PDCCH, CSI-RS, TRS, etc. outside of an active downlink BWP. The UE may not transmit PUSCH or PUCCH outside of an active uplink BWP. The UE may receive an indication from a network to switch from a first active BWP to a second active BWP from the set of configured BWPs. As illustrated in FIG. 4A, each downlink BWP may include a control resource set (CORESET) corresponds to a configurable set of physical resources in time and frequency that a UE uses to monitor for PDCCH/DCI when the corresponding BWP is activated. For example, if the UE receives an indication to switch to BWP 1 the UE may monitor for control signaling in the corresponding CORESET in BWP 1. If the UE receives an indication to switch to BWP 2, the UE may monitor for control signaling in the CORESET in BWP 2.

While the impact of a false positive DCI detection associated with procedures other than BWP switching may be limited to 1 slot, such as a falsely transmitted PUSCH transmission on uplink or an attempt to receive a PDSCH that is not transmitted by the base station, a false positive DCI detection of a BWP switching request may have a longer lasting impact on the UE. For example, the UE and the base station may become out of sync based on such DCI requests, such that the UE and the base station may have to perform a random access channel (RACH) procedure to resynchronize (e.g., after the UE declares a radio link failure (RLF) and possibly radio resource control (RRC) reestablishment). As an example, if the UE detects a BWP switch from BWP 1 to BWP 2 in FIG. 4A, the UE will monitor the CORESET in BWP 2 for further control signaling and scheduling of communication. If the detection was a false detection, the base station may continue to send control signaling in the CORESET of BWP 1, which is not monitored by the UE. Similarly, the UE may attempt to communicate with the base station in an uplink BWP in which the base station does not expect to receive PUCCH or PUSCH from the UE. As an example, the UE may send a scheduling request for uplink resources in BWP 2 based on the false detection of DCI indicating to the UE to switch to BWP 2, whereas the base station may continue to monitor BWP 1 for such scheduling requests from the UE. Aspects presented herein enable the UE to verify/confirm whether a detected DCI request to switch BWPs is a false positive detection. In some aspects, the verification may be referred to as pruning DCIs for BWP switching.

FIG. 4B is a call flow diagram 400 illustrating communications between a UE 402 and a network entity 404. The network entity 404 may correspond to a base station or an entity at a base station, such as a CU, a DU, an RU, etc. Noise received by a UE 402 may cause the UE 402 to detect a false positive DCI. In some examples, false positive DCI detection may correspond to a DCI request received (e.g., at 406) for switching from a first BWP to a second BWP. Hence, the UE 402 may be configured to verify/confirm whether the DCI request received, at 406, is associated with a false positive detection, so that the UE 402 may drop or "prune" the DCI request in association with switching BWPs or whether the DCI request received, at 406, to switch the BWPs is an actual DCI transmitted from the network entity 404. The UE 402 may use various information logs to infer that the DCI request detected by the UE 402 was not sent by the base station/network entity 404, and is instead a false positive detection of DCI. Without a confirmation procedure being performed by the UE 402, the DCI request detected/received (e.g., at 406) by the UE 402 may be accepted/acting upon the UE 402, such that the UE may switch the BWP and become out of sync with the base station/network entity 404. A recovery by the UE 402 and the base station/network entity 404 from out of sync scenarios may be a relatively slow process, as the UE 402 and the base station/network entity 404 may have to perform a RACH procedure to resynchronize. If the UE 402 and the base station/network entity 404 are out of sync as a result of the UE 402 switching the BWP, the base station/network entity 404 may not decode scheduling requests received from the UE 402 (e.g., CSI requests) without performing the RACH procedure with the UE 402.

While false positive DCI detections may statistically occur with a certain regularity, an impact of some false positive DCI detections may be greater than for other false positive DCI detections. For example, a DCI request for the UE 402 to switch an active BWP may cause the UE 402 to miss one or more grants if the DCI request is a false positive DCI request that was not sent by the base station/network entity 404, as the UE 402 and the base station/network entity 404 may have conflicting understandings as to which BWP is the active BWP. The base station/network entity 404 may not be able to decode scheduling requests, CSI reports, SRS, etc., received from the UE 402 based on the conflict. If the UE 402 and the base station/network entity 404 disagree on the current/active BWP, the UE 402 may also not be able to decode DCI that is sent by the base station/network entity 404. Recovery procedures may follow an RLF detected by the UE 402 and an RRC reestablishment procedure.

The UE 402 may be configured to perform PDCCH blind detection for decoding, at 408, a DCI request, which may be used to generate a DCI decoder metric. The DCI may be protected based on a 24-bit cyclic redundancy check (CRC). However, 3 CRC bits may be used for error correction by a Polar code decoder where, e.g., 8 best paths/channels may be stored for selecting a path/channel that passes the CRC. The remaining 21 bits of the CRC may be used, at 410, for estimating a number of errors associated with the DCI. A PDCCH false detection probability may be higher in cases where the UE 402 decodes an increased amount of information (e.g., every millisecond). A slot that corresponds to a 15 KHz SCS may be decoded every millisecond.

The PDCCH false detection probability may be approximated based on: Num_blind_Decodes*Num_RNTIs*2^-effective_CRC_length, where the Num_blind_Decodes corresponds to the number of blind decoding hypotheses. For instance, 44 blinding decoding hypotheses may be associated with a SCS of 15 kHz. The Num_RNTIs corresponds to the number of radio network temporary identifiers (RNTIs) associated with each blind decoding attempt. For example, the Num_RNTIs may equal 1 in cases where the UE 402 is associated with a cell RNTI (C-RNTI). The Effective_CRC_length may equal 21, which may be based on the number of CRC bits used for error detection. Thus, in an example where the Num_blind_Decodes=44, the Num_RNTIs=1, and the effective_CRC_length=21, the PDCCH false detection probability may be equal to 44*1*2-21. Based on one decoding attempt being performed every millisecond, one false positive DCI may be detected roughly every 60 seconds (e.g., 1 per minute).

False positive DCI detections may be rejected, at 412, based on inconsistencies with associated content and/or certain reserved values to prevent the UE 402 from attempting to decode the content associated with the false positive DCI request. A UE procedure for receiving control information may be that the UE 402 discards the information in the DCI format if the UE 402 detects a DCI format with inconsistent information. Some false positive DCIs that are accepted by the UE 402 may have a different impact on the UE 402 based on whether the false positive DCI is associated with switching the BWP or whether the false positive DCI is associated with a different procedure. The impact of a false positive DCI associated with a different procedure may be limited to a triggered PUSCH transmission on uplink, which may generate interference, but is limited to 1 slot. If the false positive DCI is associated with a PDSCH reception, the impact on the UE 402 may be limited to decoding noise and triggering a NACK. While the UE 402 may generate interference based on sending a NACK that is not associated with a transmission of the base station/network entity 404, the interference will again be limited to 1 slot. Thus, the impact of false positive DCI detections that are not associated with requests to switch the BWP may be limited to one unnecessary PUSCH transmission or one unnecessary PDSCH reception.

DCI pruning/elimination procedures based on information consistency may not be sufficient for DCI requests associated with BWP switching. A false positive DCI detection corresponding to a request to switch the BWP may have a longer lasting impact on the UE 402 than 1 slot. For example, a false positive DCI that requests the UE 402 to switch the BWP may cause the UE 402 and the base station/network entity 404 to become out of sync with each other. The UE 402 may miss true DCIs transmitted by the base station/network entity 404, as the base station/network entity 404 may be scheduling the UE 402 on the un-switched BWP. The UE 402 may also attempt to communicate with the base station/network entity 404 via SRS, transmitting feedback, etc. However, the attempts to communicate with the base station/network entity 404 may be regarded as noise by the base station/network entity 404 that may not be acted upon. In order to re-synchronize with the base station/network entity 404, the UE 402 may have to trigger a RACH procedure with the base station/network entity 404.

Accordingly, the DCI request received, at 406, in association with BWP switching may be rejected, at 412, based on information consistency, a DCI decoder/energy metric, and/or a number of error-corrected symbols. Information consistency may be based on a consistency with a TDD pattern for a PDSCH reception or a PUSCH transmission. Such procedures may be performed for TDD cells. BWP switching may be performed for larger BWPs (e.g., 100 megahertz), as smaller BWPs, such as 20-40 megahertz, may not have multiple BWPs configured for FDD operations. TDD patterns may include slots that are reserved for downlink, slots that are reserved for uplink, and slots that are flexible. When the UE 402 receives, at 406, the DCI associated with the request to switch the BWP, the UE 402 may verify a consistency of the information included in the DCI with the TDD pattern. For example, if the UE 402 receives a DCI 1_1 that indicates a BWP switch, but the slots for PDSCH reception do not correspond to downlink slots, the UE 402 may reject, at 412, the DCI based on a lack of consistency with the TDD pattern. In examples, the UE 402 may determine that the DCI request corresponds to a false positive DCI detection based on at least one symbol for PDSCH reception not corresponding to a downlink symbol.

A DCI decoder metric/energy metric generated based on decoding, at 408, the DCI request and/or a number of error-corrected symbols during Polar decoding of the DCI estimated, at 410, in association with the DCI may also be verified by the UE 402. Reduced DCI decoding/energy metrics compared to other DCIs for a current channel may indicate an increased probability that the DCI request corresponds to a false positive detection. False positives detections based on noise may have reduced DCI decoding/energy metrics (e.g., lower energy metric). The energy metric may be associated with Polar decoding procedures. The energy metric may be determined based on a relationship between an expected path and the actual path of the received DCI. An increased number of corrected Rx symbols may correspond to a lower energy metric. The energy metric may be determined based on comparing a best path/channel and a second best path/channel. If the detected DCI corresponds to an actual DCI transmitted by the base station/network entity 404, the best path/channel may have a much higher energy metric than the second best path/channel. However, if the detected DCI corresponds to a false positive DCI, the energy metrics for the best path/channel and the second best path/channel may be close to the same. In some cases, the second best path/channel may even have a higher energy metric than the best path/channel but may be rejected based on a failed CRC for the second best path/channel. Thus, the UE 402 may determine whether to reject, at 412, the detected DCI based on energy metric information. For TDD, both information consistency and the energy metric may be verified by the UE 402. For FDD, the UE 402 may verify the energy metric, but may not verify the information consistency.

In an example, the UE 402 may have a current active BWP=1 and may receive a DCI 0_1 at slot 6 with a BWP indicator=0 and k2=10. For example, k2 corresponds to an offset between the reception of the DCI and an associated PUSCH transmission. The DCI request received, at 406, by the UE 402 may correspond to a false positive DCI detection from noise that does not correspond to an actual DCI transmitted by the base station/network entity 404. For k2 to be large enough to switch the BWP, at 416, the PUSCH transmission may be performed no sooner than slot 16. However, the TDD pattern may indicate that slot 16 is a full downlink slot. If the DCI was an actual DCI transmitted by the base station/network entity 404, the base station/network entity 404 would not have requested the UE 402 to transmit a PUSCH on a downlink slot. Thus, the UE 402 may reject, at 412, the DCI as being a false positive detection of the DCI.

If the UE 402 were to act based on the DCI 0_1 and perform the BWP switching from BWP identifier (ID) 1 to BWP ID 2, the UE 402 and the base station/network entity 404 may become out of sync with each other based on the UE 402 and the base station/network entity 404 operating in accordance with different BWP IDs. For example, the UE 402 may not receive grants sent by the base station/network entity 404 on BWP ID 1, or the base station/network entity 404 may attempt to decode periodic SRS/CQI on BWP ID 1 that was not transmitted by the UE 402. The UE 402 may recover/re-synchronize with the base station/network entity 404 after performing a RACH procedure with the base station/network entity 404 and possibly an RRC reestablishment procedure.

The UE 402 may verify the information consistency for a TDD cell. While BWP switching may also apply to FDD cells, TDD cells may be associated with a larger bandwidth. For FR1, a TDD cell may include a channel bandwidth of 100 MHz, while an FDD cell may include a channel bandwidth of 20 MHz. The UE 402 may reject, at 412, a DCI request received, at 406, for BWP switching based on PDSCH reception timing or PUSCH transmission timing that is inconsistent with the TDD pattern (e.g., at least by 1 symbol). If at least 1 symbol in a requested PUSCH transmission or PDSCH reception does not match the TDD pattern, the UE 402 may prune/reject, at 412, the DCI as being a false positive detection.

A time domain resource allocation (TDRA) for a BWP switching request based on DCI 1_1 may be indicative of a k0 value, a starting symbol, a number of symbol combinations where k0 may be valid for a UE switching timer for the BWP, and/or PDSCH symbols that are either downlink symbols or flexible symbols that leave enough time to perform downlink/uplink switching. For example k0 corresponds to an offset between DCI reception and PDSCH reception. The value of k0 may not be equal to 0, as k0 should correspond to a valid value for the UE switching timer. If at least one symbol corresponds to an uplink symbol, the UE 402 may determine that the DCI request received, at 406, for the BWP switching should be pruned/rejected, at 412. The TDRA for a BWP switching request based on DCI 0_1 may be indicative of a k2 value, a starting symbol, a number of symbol combinations where k2 may be valid for the UE switching timer for BWP, and/or PUSCH symbols that are either uplink symbols or flexible symbols that leave enough time to perform uplink/downlink switching. Again, k2 corresponds to the offset between reception of the DCI and the PUSCH transmission. The vlaue of k2 may not be equal to 0, as k2 should correspond to a valid value for an uplink switching timer for BWP switching. The PUSCH symbols should be uplink symbols or flexible symbols. The UE 402 may verify that no PUSCH symbol is a downlink symbol or the UE 402 may prune/reject the DCI, at 412.

The UE 402 may likewise verify the energy metrics associated with the DCI decoder. A Polar decoder may be used to compute path/channel metrics based on a log likelihood ratio (LLR) of channel symbols and a consistency between the path/channel and a sign of the LLR for the path/channel symbol. In cases where the CRC passes, the UE 402 may confirm that the energy metric is also at a sufficient level. For example, the UE 402 may determine an SNR-based threshold for retaining or rejecting the DCI. A best energy metric may be adjusted based on an aggregation level and/or radio conditions. The UE 402 may re-encode the DCI data and compute/estimate, at 410, a number of error-corrected symbols based on the number of LLRs having a sign that is inconsistent with the re-encoded data.

The UE 402 may utilize one or more metrics to determine whether a detected DCI is a false positive DCI or an actual DCI transmitted by the base station/network entity 404. For example, the UE 402 may determine whether the detected DCI is a false positive DCI based on a path metric of the best path/channel with a passed CRC. An SNR-based threshold may be used to retain or reject the DCI request decoded, at 408, by the UE 402. The path metric may be adjusted based on an aggregation level. The UE 402 may likewise determine whether the detected DCI is a false positive DCI based on a difference in the path metrics between best path/channel and the second best path/channel. If the DCI corresponds to an actual DCI transmitted by the base station/network entity 404, a difference between the best path energy and the second best path energy may be large. Further, the UE 402 may determine whether the detected DCI is a false positive DCI based on a number of error-corrected symbols estimated, at 410, in association with the DCI. In average to high SNR configurations, the detected DCI may be associated with a reduced number of error-corrected symbols.

An energy metric pruning determination of the UE 402 may be more inflexible for DCIs requesting a BWP switch than for other types of DCIs, as a false positive detection of a DCI request for a BWP switch has a longer lasting impact (e.g., RLF, RACH procedure, RRC reestablishment, etc.) than for a DCI having a BWP indicator corresponding to a current BWP ID. A false positive detection of a DCI that does not request BWP switching may generate interference, but only for 1 slot. While the UE 402 may prune/reject, at 412, an actual DCI transmitted by the base station/network entity 404 in certain radio fade conditions, the base station/network entity 404 may retransmit, at 414, to the UE 402 one or more subsequent DCI requests to switch the BWPs, if the base station/network entity 404 does not detect a corresponding PUSCH (e.g., based on DCI 0_1 requesting BWP switching) or a corresponding PUCCH HARQ ACK/NACK for PDSCH (e.g., based on DCI 1_1 requesting BWP switching).

The base station/network entity 404 may be expecting to receive an ACK from the UE 402. For example, the UE 402 may be expected to receive the PDSCH and transmit PUCCH information based on the DCI 1_1. Thus, the base station/network entity 404 may monitor for the PUCCH and, if the energy associated with the PUCCH is low because the UE 402 did not receive the PDSCH, the base station/network entity 404 may retransmit, at 414, one or more subsequent DCI requests to switch the BWPs. For example, the base station/network entity 404 may retransmit, at 414, the DCI four times for a BWP switching request. Thus, the UE 402 may be likely to accept a subsequent DCI request, at 414, for BWP switching when radio fades are uncorrelated and may switch, at 416, the BWPs based on the one or more subsequent DCI requests. Initially rejecting, at 412 (e.g., incorrectly), an actual DCI transmitted by the base station/network entity 404 as a false positive DCI may therefore be limited to delaying the actual BWP switching, at 416, by the UE 402.

Figure 5:
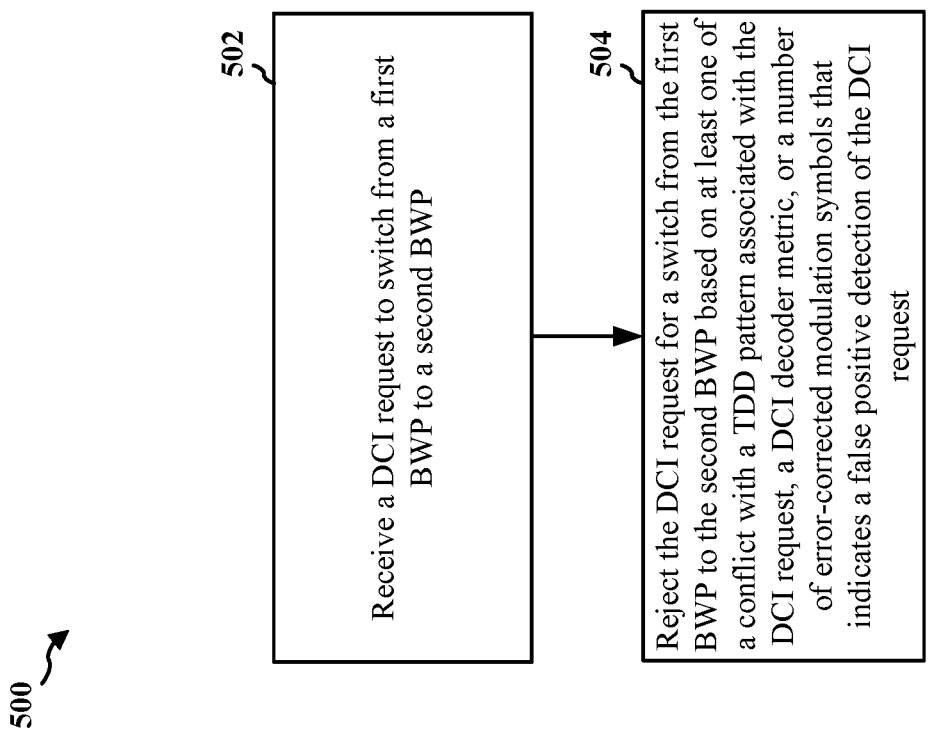
FIG. 5 is a flowchart of a method of wireless communication at a UE.

FIG. 5 is a flowchart 500 of a method of wireless communication. The method may be performed by a UE (e.g., the UE 104, 350, 402, the apparatus 704, etc.), which may include the memory 360 and which may correspond to the entire UE 104, 350, 402 or apparatus 704, or a component of the UE 104, 350, 402 or the apparatus 704, such as the TX processor 368, the RX processor 356, the controller/processor 359, the cellular baseband processor 724, and/or the application processor 706.

At 502, the UE may receive a DCI request to switch from a first BWP to a second BWP. For example, referring to FIG. 4B, the UE 402 may receive, at 406, a DCI request to switch BWPs (e.g., from a current BWP ID to a different BWP ID). In some examples, the DCI request received, at 406, to switch BWPs may correspond to a false positive detection of the DCI request by the UE 402 (e.g., received in noise). In other examples, the UE 402 may detect/receive an actual DCI request transmitted from the network entity 404. The reception, at 502, may be performed by the DCI acceptance component 198 of the apparatus 704 in FIG. 7.

At 504, the UE may reject the DCI request for a switch from the first BWP to the second BWP based on at least one of a conflict with a TDD pattern associated with the DCI request, a DCI decoder metric, or a number of error-corrected modulation symbols that indicates a false positive detection of the DCI request. For example, referring to FIG. 4B, the UE 402 may reject, at 412, the DCI request received, at 406, to switch BWPs. The rejection, at 412, may be based on a TDD pattern, the DCI decoder metric, and/or a number of error corrected symbols associated with the DCI received, at 406, by the UE 402. The rejection, at 608, may be performed by the DCI acceptance component 198 of the apparatus 704 in FIG. 7.

Figure 6:
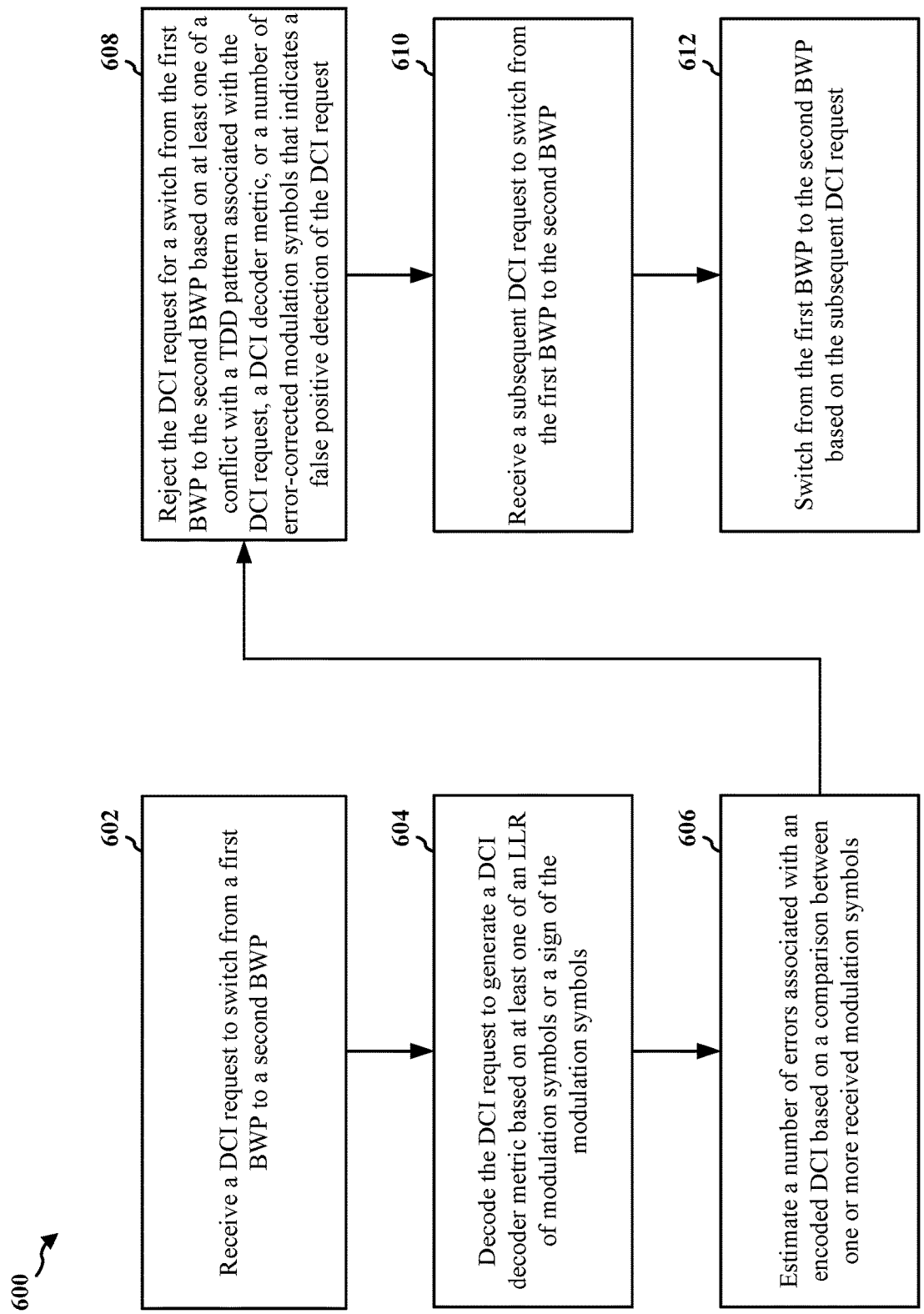
FIG. 6 is a flowchart of a method of wireless communication at a UE.

FIG. 6 is a flowchart 600 of a method of wireless communication. The method may be performed by a UE (e.g., the UE 104, 350, 402, the apparatus 704, etc.), which may include the memory 360 and which may correspond to the entire UE 104, 350, 402 or apparatus 704, or a component of the UE 104, 350, 402 or the apparatus 704, such as the TX processor 368, the RX processor 356, the controller/processor 359, the cellular baseband processor 724, and/or the application processor 706.

At 602, the UE may receive a DCI request to switch from a first BWP to a second BWP. For example, referring to FIG. 4B, the UE 402 may receive, at 406, a DCI request to switch BWPs (e.g., from a current BWP ID to a different BWP ID). In some examples, the DCI request received, at 406, to switch BWPs may correspond to a false positive detection of the DCI request by the UE 402 (e.g., received in noise). In other examples, the UE 402 may detect/receive an actual DCI request transmitted from the network entity 404. The reception, at 602, may be performed by the DCI acceptance component 198 of the apparatus 704 in FIG. 7.

At 604, the UE may decode the DCI request to generate a DCI decoder metric based on at least one of an LLR of modulation symbols or a sign of the modulation symbols. For example, referring to FIG. 4B, the UE 402 may decode, at 408, the DCI request received, at 406. The decoding, at 408, may be performed to generate a DCI decoder metric associated with the DCI request received, at 406. The decoding, at 604, may be performed by the DCI acceptance component 198 of the apparatus 704 in FIG. 7.

At 606, the UE may estimate a number of errors associated with an encoded DCI based on a comparison between one or more received modulation symbols. For example, referring to FIG. 4B, the UE 402 may estimate, at 410, a number of errors associated with the DCI received, at 406, by the UE 402. The estimation, at 606, may be performed by the DCI acceptance component 198 of the apparatus 704 in FIG. 7.

At 608, the UE may reject the DCI request for a switch from the first BWP to the second BWP based on at least one of a conflict with a TDD pattern associated with the DCI request, a DCI decoder metric, or a number of error-corrected modulation symbols that indicates a false positive detection of the DCI request. For example, referring to FIG. 4B, the UE 402 may reject, at 412, the DCI request received, at 406, to switch BWPs. The rejection, at 412, may be based on a TDD pattern, the DCI decoder metric, and/or a number of error corrected symbols associated with the DCI received, at 406, by the UE 402. The rejection, at 608, may be performed by the DCI acceptance component 198 of the apparatus 704 in FIG. 7.

At 610, the UE may receive a subsequent DCI request to switch from the first BWP to the second BWP. For example, referring to FIG. 4B, the UE 402 may receive, at 414, from the network entity 404 one or more subsequent DCI requests to switch BWPs. For instance, the DCI request received, at 406, to switch BWPs may be an actual DCI request transmitted from the network entity 404, as opposed to a false positive detection of a DCI request (e.g., received in noise). Accordingly, the one or more subsequent DCI requests received, at 414, from the network entity 404 to switch BWPs may correspond to one or more retransmissions of the DCI request received, at 406, by the UE 402 to switch BWPs. The reception, at 610, may be performed by the DCI acceptance component 198 of the apparatus 704 in FIG. 7.

At 612, the UE may switch from the first BWP to the second BWP based on the subsequent DCI request. For example, referring to FIG. 4B, the UE 402 may switch, at 416, BWPs based on the one or more subsequent DCI requests received, at 414, from the network entity 404. For instance, if the UE 402 incorrectly determines/rejects an initial DCI request received, at 406, as being a false positive detection, the UE 402 may reverse the determination to reject the DCI request received, at 406, based on one or more retransmissions of the DCI request received (e.g., at 414) from the network entity 404. The switching, at 612, may be performed by the DCI acceptance component 198 of the apparatus 704 in FIG. 7.

Figure 7:
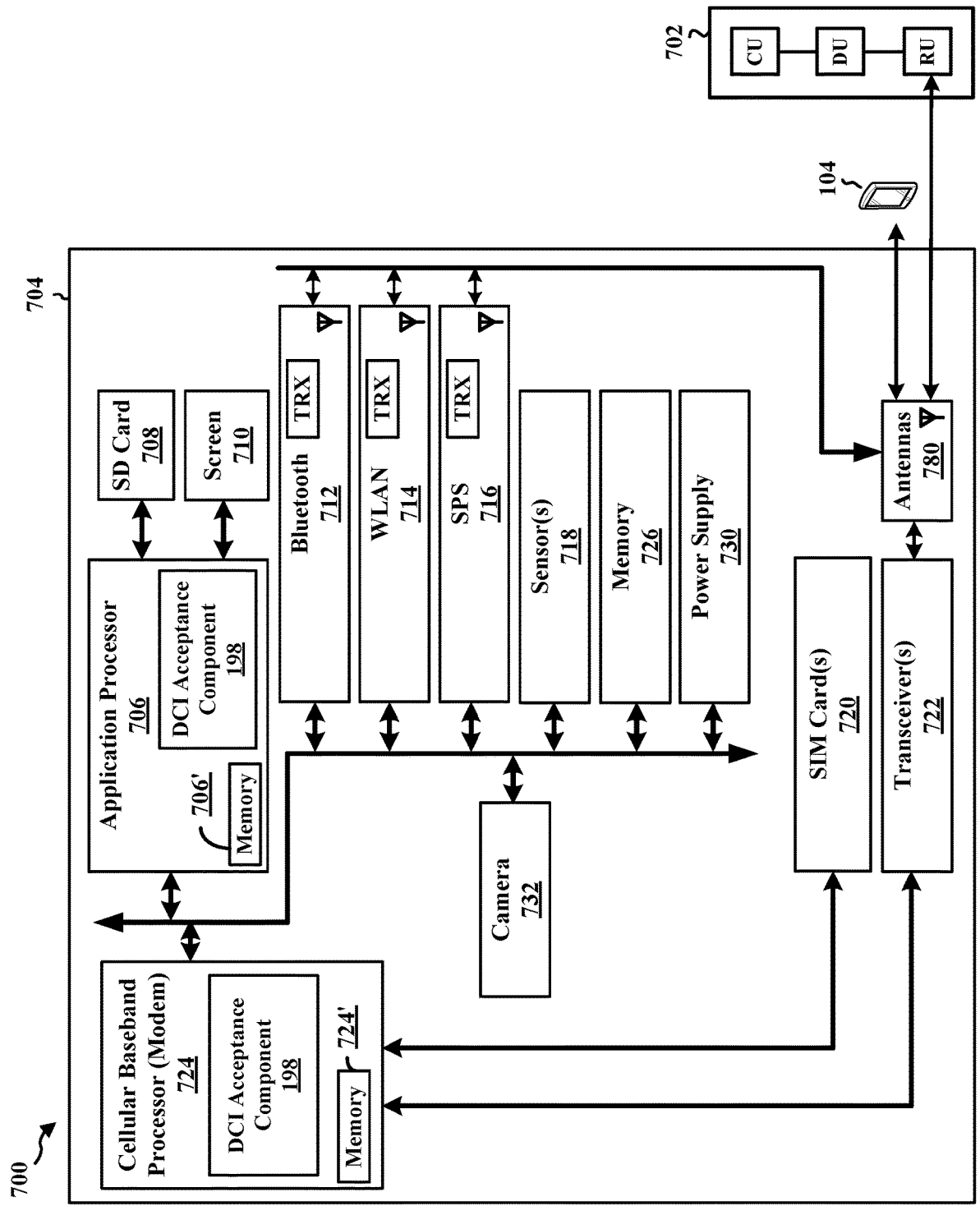
FIG. 7 is a diagram illustrating an example of a hardware implementation for an example apparatus and/or network entity.

FIG. 7 is a diagram 700 illustrating an example of a hardware implementation for an apparatus 704. The apparatus 704 may be a UE, a component of a UE, or may implement UE functionality. In some aspects, the apparatus 704 may include a cellular baseband processor 724 (also referred to as a modem) coupled to one or more transceivers 722 (e.g., cellular RF transceiver). The cellular baseband processor 724 may include on-chip memory 724'. In some aspects, the apparatus 704 may further include one or more subscriber identity modules (SIM) cards 720 and an application processor 706 coupled to a secure digital (SD) card 708 and a screen 710. The application processor 706 may include on-chip memory 706'. In some aspects, the apparatus 704 may further include a Bluetooth module 712, a WLAN module 714, an SPS module 716 (e.g., GNSS module), one or more sensor modules 718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional modules of memory 726, a power supply 730, and/or a camera 732. The Bluetooth module 712, the WLAN module 714, and the SPS module 716 may include an on-chip transceiver (TRX) (or in some cases, just a receiver (RX)). The Bluetooth module 712, the WLAN module 714, and the SPS module 716 may include their own dedicated antennas and/or utilize the antennas 780 for communication. The cellular baseband processor 724 communicates through the transceiver(s) 722 via one or more antennas 780 with the UE 104 and/or with an RU associated with a network entity 702. The cellular baseband processor 724 and the application processor 706 may each include a computer-readable medium/memory 724', 706', respectively. The additional modules of memory 726 may also be considered a computer-readable medium/memory. Each computer-readable medium/memory 724', 706', 726 may be non-transitory. The cellular baseband processor 724 and the application processor 706 are each responsible for general processing, including the execution of software stored on the computer-readable medium/memory. The software, when executed by the cellular baseband processor 724/application processor 706, causes the cellular baseband processor 724/application processor 706 to perform the various functions described supra. The computer-readable medium/memory may also be used for storing data that is manipulated by the cellular baseband processor 724/application processor 706 when executing software. The cellular baseband processor 724/application processor 706 may be a component of the UE 350 and may include the memory 360 and/or at least one of the TX processor 368, the RX processor 356, and the controller/processor 359. In one configuration, the apparatus 704 may be a processor chip (modem and/or application) and include just the cellular baseband processor 724 and/or the application processor 706, and in another configuration, the apparatus 704 may be the entire UE (e.g., see 350 of FIG. 3) and include the additional modules of the apparatus 704.

As discussed supra, the DCI acceptance component 198 is configured to receive a DCI request to switch from a first BWP to a second BWP; and reject the DCI request for a switch from the first BWP to the second BWP based on at least one of a conflict with a TDD pattern associated with the DCI request, a DCI decoder metric, or a number of error-corrected modulation symbols that indicates a false positive detection of the DCI request. The DCI acceptance component 198 may be within the cellular baseband processor 724, the application processor 706, or both the cellular baseband processor 724 and the application processor 706. The DCI acceptance component 198 may be one or more hardware components specifically configured to carry out the stated processes/algorithm, implemented by one or more processors configured to perform the stated processes/algorithm, stored within a computer-readable medium for implementation by one or more processors, or some combination thereof. The DCI acceptance component 198 and/or another component of the cellular baseband processor 724 or application processor may be configured to perform any of the aspects described in connection with FIGS. 5, 6, or the aspects performed by the UE in FIG. 4B.

As shown, the apparatus 704 may include a variety of components configured for various functions. In one configuration, the apparatus 704, and in particular the cellular baseband processor 724 and/or the application processor 706, includes means for receiving a DCI request to switch from a first BWP to a second BWP; and means for rejecting the DCI request for a switch from the first BWP to the second BWP based on at least one of a conflict with a TDD pattern associated with the DCI request, a DCI decoder metric, or a number of error-corrected modulation symbols that indicates a false positive detection of the DCI request. The apparatus 704 further includes means for decoding the DCI request to generate the DCI decoder metric based on at least one of an LLR of the modulation symbols or a sign of the modulation symbols. The apparatus 704 further includes means for estimating a number of errors associated with an encoded DCI based on a comparison between one or more received modulation symbols, the DCI request to switch from the first BWP to the second BWP rejected based on the number of errors associated with the one or more received modulation symbols. The apparatus 704 further includes means for receiving a subsequent DCI request to switch from the first BWP to the second BWP; and means for switching from the first BWP to the second BWP based on the subsequent DCI request. The means may be the DCI acceptance component 198 of the apparatus 704 configured to perform the functions recited by the means. As described supra, the apparatus 704 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving a DCI request to switch from a first BWP to a second BWP; and rejecting the DCI request for a switch from the first BWP to the second BWP based on at least one of a conflict with a TDD pattern associated with the DCI request, a DCI decoder metric, or a number of error-corrected modulation symbols that indicates a false positive detection of the DCI request.

Aspect 2 may be combined with aspect 1 and includes that the DCI request to switch from the first BWP to the second BWP is rejected based on the conflict with the TDD pattern, and includes that the false positive detection of the DCI request is based on at least one of a PDSCH reception or a PUSCH transmission associated with the switch that includes a timing conflict with the TDD pattern.

Aspect 3 may be combined with any of aspects 1-2 and includes that the timing conflict with the TDD pattern corresponds to the at least one of the PDSCH reception or the PUSCH transmission being offset within the TDD pattern by at least one symbol.

Aspect 4 may be combined with any of aspects 1-3 and includes that the DCI request to switch from the first BWP to the second BWP is rejected based on the conflict with the TDD pattern, and includes that the DCI request to switch from the first BWP to the second BWP is received based on at least one of a DCI 1_1 or a DCI 0_1, and includes that a first TDRA associated with the DCI 1_1 is indicative of at least one of a first offset between a DCI reception and a PDSCH reception, a starting symbol, or a number of symbol combinations, and includes that a second TDRA associated with the DCI 0_1 is indicative of at least one of a second offset between the DCI reception and a PUSCH transmission, the starting symbol, or the number of symbol combinations.

Aspect 5 may be combined with any of aspects 1-4 and includes that the first offset and the second offset are based on a BWP switching time.

Aspect 6 may be combined with any of aspects 1-5 and includes that the DCI request to switch from the first BWP to the second BWP is rejected based on the DCI decoder metric, the aspect further including decoding the DCI request to generate the DCI decoder metric based on an LLR associated with the error-corrected modulation symbols, the error-corrected modulation symbols corresponding to OFDM symbols associated with the DCI request.

Aspect 7 may be combined with any of aspects 1-6 and further includes estimating a number of errors associated with an encoded DCI based on a comparison between one or more received modulation symbols, the DCI request to switch from the first BWP to the second BWP rejected based on the number of errors associated with the one or more received modulation symbols.

Aspect 8 may be combined with any of aspects 1-7 and includes that the DCI request to switch from the first BWP to the second BWP is rejected based on the DCI decoder metric, and includes that the DCI decoder metric corresponds to at least one of a highest SNR, a difference between the highest SNR and a second highest SNR, or the number of error-corrected modulation symbols.

Aspect 9 may be combined with any of aspects 1-8 and includes that the DCI request to switch from the first BWP to the second BWP is rejected based on the DCI decoder metric that is based on a first false positive detection threshold associated with a BWP switching DCI, the first false positive detection threshold being lower than a second false positive detection threshold associated with a non-BWP switching DCI.

Aspect 10 may be combined with any of aspects 1-9 and further includes receiving a subsequent DCI request to switch from the first BWP to the second BWP; and switching from the first BWP to the second BWP based on the subsequent DCI request.

Aspect 11 may be combined with any of aspects 1-10 and includes that the DCI request is received based on blind decoding of a PDCCH.

Aspect 12 may be combined with any of aspects 1-11 and includes that the false positive detection of the DCI request is based on at least one of a reserved value associated with the DCI request or an inconsistent value in the DCI request.

Aspect 13 is an apparatus for wireless communication including memory and at least one processor coupled to the memory and configured to perform a method as in any of aspects 1-12.

Aspect 14 is an apparatus for wireless communication including means for implementing a method as in any of aspects 1-12.

Aspect 15 may be combined with any of aspects 13-14 and further includes at least one of a transceiver or an antenna coupled to at least one processor of the apparatus.

Aspect 16 is a non-transitory computer-readable medium storing computer executable code, the code when executed by at least one processor causes the at least one processor to implement a method as in any of aspects 1-12.

What is claimed is:

1. An apparatus for wireless communication at a user equipment (UE), comprising:
    memory; and
    at least one processor coupled to the memory and, based at least in part on information stored in the memory, the at least one processor is configured to:
        receive a downlink control information (DCI) request to switch from a first bandwidth part (BWP) to a second BWP; and
        reject the DCI request for a switch from the first BWP to the second BWP based on at least one of a conflict with a time division duplex (TDD) pattern associated with the DCI request or a DCI decoder metric that indicates a false positive detection of the DCI request,
        wherein the conflict with the TDD pattern corresponds to a timing conflict in which at least one of a physical downlink shared channel (PDSCH) reception or a physical uplink shared channel (PUSCH) transmission associated with the switch to the second BWP is offset by at least one symbol with the TDD pattern, or
        wherein the DCI decoder metric that indicates the false positive detection of the DCI request is based on at least one of:
            a first false positive detection threshold associated with a BWP switching DCI, the first false positive detection threshold being lower than a second false positive detection threshold associated with a non-BWP switching DCI, or
            a difference between a highest signal-to-noise ratio (SNR) and a second highest SNR.

2. The apparatus of claim 1, wherein the DCI request to switch from the first BWP to the second BWP is rejected based on the conflict with the TDD pattern, and wherein the false positive detection of the DCI request is based on the at least one of the PDSCH reception or the PUSCH transmission associated with the switch being offset within the TDD pattern by the at least one symbol.

3. The apparatus of claim 2, wherein the DCI request to switch from the first BWP to the second BWP is received based on at least one of a DCI 1_1 or a DCI 0_1, wherein a first time domain resource allocation (TDRA) associated with the DCI 1_1 is indicative of at least one of a first offset between a DCI reception and the PDSCH reception, a starting symbol, or a number of symbol combinations that includes the timing conflict of the at least one symbol with the TDD pattern, and wherein a second TDRA associated with the DCI 0_1 is indicative of at least one of a second offset between the DCI reception and the PUSCH transmission, the starting symbol, or the number of symbol combinations that includes the timing conflict of the at least one symbol with the TDD pattern.

4. The apparatus of claim 3, wherein the first offset and the second offset are based on a BWP switching time.

5. The apparatus of claim 1, wherein the DCI request to switch from the first BWP to the second BWP is rejected based on the DCI decoder metric that includes the difference between the highest SNR and the second highest SNR.

6. The apparatus of claim 1, wherein the DCI request to switch from the first BWP to the second BWP is rejected based on the DCI decoder metric that is based on the first false positive detection threshold associated with the BWP switching DCI, and wherein a rejection of the DCI request to switch from the first BWP to the second BWP is based on the first false positive detection threshold being lower than the second false positive detection threshold associated with the non-BWP switching DCI.

7. The apparatus of claim 1, wherein the at least one processor is further configured to:
receive a subsequent DCI request to switch from the first BWP to the second BWP; and
switch from the first BWP to the second BWP based on the subsequent DCI request.

8. The apparatus of claim 1, wherein the DCI request is received based on blind decoding of a physical downlink control channel (PDCCH).

9. The apparatus of claim 1, wherein the false positive detection of the DCI request is further based on at least one of a reserved value associated with the DCI request or an inconsistent value in the DCI request.

10. The apparatus of claim 1, further comprising at least one of a transceiver or an antenna coupled to the at least one processor.

11. An apparatus for wireless communication at a user equipment (UE), comprising:
memory; and
at least one processor coupled to the memory and, based at least in part on information stored in the memory, the at least one processor is configured to:
receive a downlink control information (DCI) request to switch from a first bandwidth part (BWP) to a second BWP;
decode the DCI request to generate a DCI decoder metric based on a log likelihood ratio (LLR) associated with error-corrected modulation symbols, the error-corrected modulation symbols corresponding to orthogonal frequency division multiplexing (OFDM) symbols associated with the DCI request; and
reject the DCI request to switch from the first BWP to the second BWP based on the DCI decoder metric that indicates a false positive detection of the DCI request, wherein the DCI request to switch from the first BWP to the second BWP is rejected based on the DCI decoder metric that includes a number of error-corrected modulation symbols.

12. The apparatus of claim 11, wherein the at least one processor is further configured to:
estimate a number of errors associated with an encoded DCI based on a comparison between one or more received modulation symbols, wherein the DCI request to switch from the first BWP to the second BWP is rejected based on the number of errors associated with the one or more received modulation symbols.

13. A method of wireless communication at a user equipment (UE), comprising:
receiving a downlink control information (DCI) request to switch from a first bandwidth part (BWP) to a second BWP; and
rejecting the DCI request for a switch from the first BWP to the second BWP based on at least one of a conflict with a time division duplex (TDD) pattern associated with the DCI request or a DCI decoder metric that indicates a false positive detection of the DCI request,
wherein the conflict with the TDD pattern corresponds to a timing conflict in which at least one of a physical downlink shared channel (PDSCH) reception or a physical uplink shared channel (PUSCH) transmission associated with the switch to the second BWP is offset by at least one symbol with the TDD pattern, or
wherein the DCI decoder metric that indicates the false positive detection of the DCI request is based on at least one of:
a first false positive detection threshold associated with a BWP switching DCI, the first false positive detection threshold being lower than a second false positive detection threshold associated with a non-BWP switching DCI, or
a difference between a highest signal-to-noise ratio (SNR) and a second highest SNR.

14. The method of claim 13, wherein the DCI request to switch from the first BWP to the second BWP is rejected based on the conflict with the TDD pattern, and wherein the false positive detection of the DCI request is based on the at least one of the PDSCH reception or the PUSCH transmission associated with the switch being offset within the TDD pattern by the at least one symbol.

15. The method of claim 14, wherein the DCI request to switch from the first BWP to the second BWP is received based on at least one of a DCI 1_1 or a DCI 0_1, wherein a first time domain resource allocation (TDRA) associated with the DCI 1_1 is indicative of at least one of a first offset between a DCI reception and the PDSCH reception, a starting symbol, or a number of symbol combinations that includes the timing conflict of the at least one symbol with the TDD pattern, and wherein a second TDRA associated with the DCI 0_1 is indicative of at least one of a second offset between the DCI reception and the PUSCH transmission, the starting symbol, or the number of symbol combinations that includes the timing conflict of the at least one symbol with the TDD pattern.

16. The method of claim 15, wherein the first offset and the second offset are based on a BWP switching time.

17. The method of claim 13, wherein the DCI request to switch from the first BWP to the second BWP is rejected based on the DCI decoder metric that includes the difference between the highest SNR and the second highest SNR.

18. The method of claim 13, wherein the DCI request to switch from the first BWP to the second BWP is rejected based on the DCI decoder metric that is based on the first false positive detection threshold associated with the BWP switching DCI, and wherein a rejection of the DCI request to switch from the first BWP to the second BWP is based on the first false positive detection threshold being lower than the second false positive detection threshold associated with the non-BWP switching DCI.

19. The method of claim 13, further comprising:
receiving a subsequent DCI request to switch from the first BWP to the second BWP; and
switching from the first BWP to the second BWP based on the subsequent DCI request.

20. The method of claim 13, wherein the DCI request is received based on blind decoding of a physical downlink control channel (PDCCH).

21. The method of claim 13, wherein the false positive detection of the DCI request is further based on at least one of a reserved value associated with the DCI request or an inconsistent value in the DCI request.

22. A method of wireless communication at a user equipment (UE), comprising:
receiving a downlink control information (DCI) request to switch from a first bandwidth part (BWP) to a second BWP;
decoding the DCI request to generate a DCI decoder metric based on a log likelihood ratio (LLR) associated with error-corrected modulation symbols, the error-corrected modulation symbols corresponding to orthogonal frequency division multiplexing (OFDM) symbols associated with the DCI request; and
rejecting the DCI request to switch from the first BWP to the second BWP based on the DCI decoder metric that indicates a false positive detection of the DCI request, wherein the DCI request to switch from the first BWP to the second BWP is rejected based on the DCI decoder metric that includes a number of error-corrected modulation symbols.

23. The method of claim 22, further comprising:
estimating a number of errors associated with an encoded DCI based on a comparison between one or more received modulation symbols, wherein the DCI request to switch from the first BWP to the second BWP is rejected based on the number of errors associated with the one or more received modulation symbols.

24. An apparatus for wireless communication at a user equipment (UE), comprising:
means for receiving a downlink control information (DCI) request to switch from a first bandwidth part (BWP) to a second BWP; and
means for rejecting the DCI request for a switch from the first BWP to the second BWP based on at least one of a conflict with a time division duplex (TDD) pattern associated with the DCI request or a DCI decoder metric that indicates a false positive detection of the DCI request,
wherein the conflict with the TDD pattern corresponds to a timing conflict in which at least one of a physical downlink shared channel (PDSCH) reception or a physical uplink shared channel (PUSCH) transmission associated with the switch to the second BWP is offset by at least one symbol with the TDD pattern, or
wherein the DCI decoder metric that indicates the false positive detection of the DCI request is based on at least one of:
a first false positive detection threshold associated with a BWP switching DCI, the first false positive detection threshold being lower than a second false positive detection threshold associated with a non-BWP switching DCI, or
a difference between a highest signal-to-noise ratio (SNR) and a second highest SNR.

25. The apparatus of claim 24, wherein the DCI request to switch from the first BWP to the second BWP is rejected based on the conflict with the TDD pattern, and wherein the false positive detection of the DCI request is based on the at least one of the PDSCH reception or the PUSCH transmission associated with the switch being offset within the TDD pattern by the at least one symbol.

26. A non-transitory computer-readable medium storing computer executable code at a user equipment (UE), the computer executable code when executed by at least one processor causes the at least one processor to:
receive a downlink control information (DCI) request to switch from a first bandwidth part (BWP) to a second BWP; and
reject the DCI request for a switch from the first BWP to the second BWP based on at least one of a conflict with a time division duplex (TDD) pattern associated with the DCI request or a DCI decoder metric that indicates a false positive detection of the DCI request,
wherein the conflict with the TDD pattern corresponds to a timing conflict in which at least one of a physical downlink shared channel (PDSCH) reception or a physical uplink shared channel (PUSCH) transmission associated with the switch to the second BWP is offset by at least one symbol with the TDD pattern, or
wherein the DCI decoder metric that indicates the false positive detection of the DCI request is based on at least one of:
a first false positive detection threshold associated with a BWP switching DCI, the first false positive detection threshold being lower than a second false positive detection threshold associated with a non-BWP switching DCI, or
a difference between a highest signal-to-noise ratio (SNR) and a second highest SNR.

27. The non-transitory computer-readable medium of claim 26, wherein the DCI request to switch from the first BWP to the second BWP is rejected based on the conflict with the TDD pattern, and wherein the false positive detection of the DCI request is based on the at least one of the PDSCH reception or the PUSCH transmission associated with the switch being offset within the TDD pattern by the at least one symbol.

28. The non-transitory computer-readable medium of claim 27, wherein the DCI request to switch from the first BWP to the second BWP is received based on at least one of a DCI 1_1 or a DCI 0_1, wherein a first time domain resource allocation (TDRA) associated with the DCI 1_1 is indicative of at least one of a first offset between a DCI reception and the PDSCH reception, a starting symbol, or a number of symbol combinations that includes the timing conflict of the at least one symbol with the TDD pattern, and wherein a second TDRA associated with the DCI 0_1 is indicative of at least one of a second offset between the DCI reception and the PUSCH transmission, the starting symbol, or the number of symbol combinations that includes the timing conflict of the at least one symbol with the TDD pattern.

29. The non-transitory computer-readable medium of claim 26, wherein the computer executable code when executed by the at least one processor causes the at least one processor to reject the DCI to switch from the first BWP to the second BWP based on the DCI decoder metric that includes the difference between the highest SNR and the second highest SNR.

30. The non-transitory computer-readable medium of claim 26, wherein the computer executable code when executed by the at least one processor causes the at least one processor to reject the DCI to switch from the first BWP to the second BWP based on the DCI decoder metric that is based on the first false positive detection threshold associated with the BWP switching DCI, and wherein a rejection of the DCI request to switch from the first BWP to the second BWP is based on the first false positive detection threshold being lower than the second false positive detection threshold associated with the non-BWP switching DCI.

* * * * *